United States Patent [19]

Bell

[11] 4,385,858
[45] May 31, 1983

[54] ATTACHMENT CLIP

[75] Inventor: Ted A. Bell, Coshocton, Ohio

[73] Assignee: Pretty Products, Inc., Coshocton, Ohio

[21] Appl. No.: 192,106

[22] Filed: Sep. 29, 1980

[51] Int. Cl.³ .............................................. F16B 37/04
[52] U.S. Cl. .................................... 411/112; 411/119; 411/374
[58] Field of Search ............... 411/112, 111, 113, 125, 411/126, 81, 373, 374, 371, 119, 121, 120, 352, 360, 524, 522, 523, 520

[56] References Cited

U.S. PATENT DOCUMENTS

| 1,063,813 | 6/1913 | McGinn | 411/126 |
| 2,288,710 | 7/1942 | Hotchkin | 411/374 X |
| 2,334,046 | 11/1943 | Tinnerman | 411/374 |
| 2,633,886 | 4/1953 | Tinnerman | 411/112 |
| 2,899,700 | 8/1959 | Egan | 411/119 X |

FOREIGN PATENT DOCUMENTS 2418124 10/1975 Fed. Rep. of Germany ...... 411/112

Primary Examiner—Ramon S. Britts
Attorney, Agent, or Firm—Robert E. Stebens

[57] ABSTRACT

An attachment clip for attachment of splash guards on automotive vehicles is provided for use in conjunction with a sheet-form element of a vehicle wheel well. This attachment clip comprises a metal clip having a Z-shaped configuration, formed with two outer legs cooperating with a center interconnecting bar to form a clamping element with respect to one outer leg and the interconnecting bar to securely engage with a sheet-form support element. The other outer leg has a T-shaped slot with a channel through which a fastener element passes to secure the clip to an article such as an automobile splash guard. The fastener element includes a bolt having a head and a shank and securing means. The interconnecting bar has punched from it a spring tongue which projects towards the channel of the T-shaped slot to retain the fastener element in a relatively fixed position against the one leg of the clip and to enter into a screwdriver slot in the bolt head to prevent rotation.

22 Claims, 4 Drawing Figures

ATTACHMENT CLIP

BACKGROUND OF THE INVENTION

This invention is directed to the providing of a suitable attachment clip which is specifically designed for mounting of automobile splash guards on a vehicle. However, it is possible to utilize this attachment clip for securing of other objects or articles on a support structure that is formed from or includes a plate such as sheet metal. Several types of clips are known for use in conjunction with sheet metal and an article or device to be mounted thereon. However, the known clips are formed such that a screw threaded bolt element incorporated in these clips extends not only through the clip element but also through both the supporting sheet metal plate and the article to be attached to that plate. Examples of such clips are shown in U.S. Pat. No. 2,654,411 issued to Bedford on Oct. 6, 1953 and No. 2,760,540 issued to Poupitch on Aug. 28, 1956.

Both Bedford and Poupitch disclose a U-shaped clip having a bolt which passes through both legs of the clip. The bolt secures the clip to the sheet metal, as shown in FIG. 5 of Bedford and FIG. 4 of Poupitch. There is a major disadvantage with this type of attachment clip when it is used to secure automobile splash guards. In the securing of automobile splash guards, the necessity of drilling a hole into the sheet metal increases the probability of formation of rust, especially when it is remembered that the area of the automotive vehicle to which the splash guard is attached is the underbody. The use of attachment means, as disclosed in Bedford and Poupitch, acts contrary to the purpose of the splash guards in preventing rust and corrosion. Therefore, the securing of a splash guard to an automotive vehicle which necessitates the drilling of holds into the body is counter-productive to the use of a splash guard, yet existing clips have failed to address the problem.

SUMMARY OF THE INVENTION

In accordance with this invention, a clip-type attachment device for use in securing automobile splash guards is provided for advantageous use in conjunction with a wheel well and exterior vehicle body panel forming a supporting structure having a thin plate or flanged lip that includes vertically extending portions. This clip-type attachment device includes a clip-form gripping element for mechanical engagement with a thin sheet-form mounting plate and a bolt which is held by the clip for securing of an article thereto. The resilient metal clip is coated with a rust resistant finish to remain effective for a maximum period of time. The clip is of a Z-shaped configuration comprising two legs which in cooperation with a center interconnecting bar and a fastening means, such as a slotted head screw-threaded bolt and nut, secure the splash guard to the vehicle body. One leg is designed to engage with the supporting structure in rigidly fixed, clamped engagement while the other leg is designed to retain the bolt-type fastening means which in turn passes through and secures the splash guard to the supporting structure. The head of this bolt is clamped between the one leg and the center interconnecting bar and is thereby secured to the clip. In addition, both legs are preferably formed with a pair of barbs that project out of the plane of the respective leg. The barbs on the one leg provide, in addition to the clamping force, a more secure means of attachment to the supporting structure while the other pair of barbs provide for a more secure attachment to the splash guards by inhibiting slippage and preventing the bolt from being disassembled from the clip.

The bolt-retaining leg has a T-shaped slot centrally formed therein with the cross bar portion of the slot being disposed adjacent the free end of the leg and of a width to permit passage therethrough of the bolt head. Extending from the cross-bar portion of the slot towards the opposite end of the clip leg is a channel having a width to permit passage of the bolt shank therethrough. This channel is located in the center of the guard leg. Aiding in the retaining of the fastening means in the channel is a spring tongue which is punched out of the interconnecting bar and then projects towards the bolt retaining leg. This spring tongue has both of its ends secured to the interconnecting bar and is formed in central, longitudinal alignment with the channel of the T-shaped slot. The spring tongue exerts pressure on the fastening means, specifically the head of the fastening means, to retain it in an immediately adjacent, contacting relationship with respect to the bolt-retaining leg and serves to prevent rotation of the bolt. Ultimate securing of the clip to the splash guard is effected by securing means such as an acorn nut which is threaded onto the shank of the bolt.

The primary objective of this invention is to provide an effective attachment clip for utilization with automobile splash guards. Important aspects of this objective are the elimination of the necessity for drilling holes into the automotive body to thus inhibit the formation of rust and corrosion by the action of water and road salt on the sheet metal in the vicinity of the wheel well.

Another objective of this invention is to provide an attachment clip which is capable of easy installation in the securing of a splash guard to an automotive vehicle.

A still further objective of this invention is to provide a spring clip that will frictionally interengage with both the splash guard and the vehicle body to inhibit slippage when once installed on the vehicle and secured to the splash guard.

Yet, another objective of this invention is to provide an attachment clip capable of retaining a bolt-type fastening means for use in the securing of an automotive splash guard. Important aspects of this objective are the inclusion of a T-shaped slot with head and channel portions. The head or cross-bar portion of the slot is of a width to accommodate the head of the screw or other appropriate fastening means while the channel is of a width greater than or at least equal to the diameter of a fastening means. Retention of the fastening means adjacent to the guard leg is aided by a spring tongue which projects upwardly from the surface of the interconnecting bar.

These and other objects and advantages of this invention will be readily apparent from the following detailed description of an illustrative embodiment thereof. Reference will be had to the accompanying drawings which illustrate the embodiment of this invention.

DESCRIPTION OF THE DRAWING FIGURES

DETAILED DESCRIPTION OF THE ILLUSTRATIVE EMBODIMENT

Figure 1:
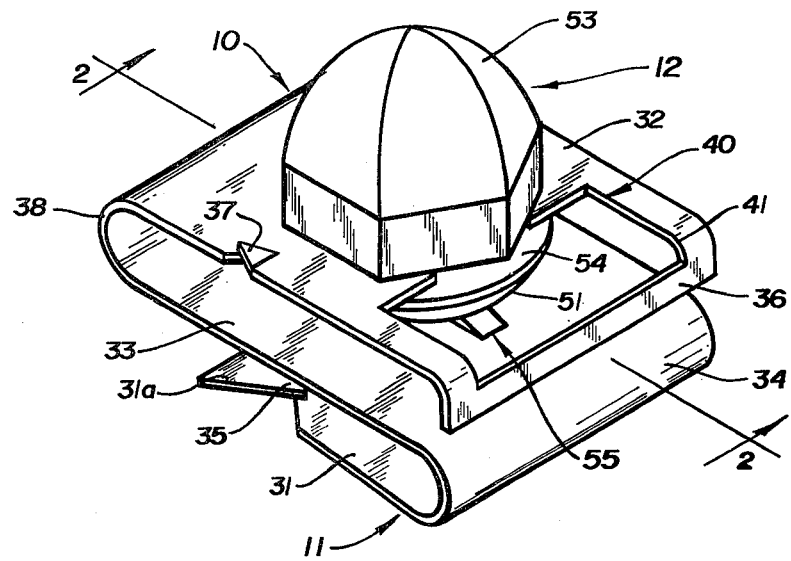
FIG. 1 is a front elevational view of an attachment clip embodying the invention.
Figure 2:
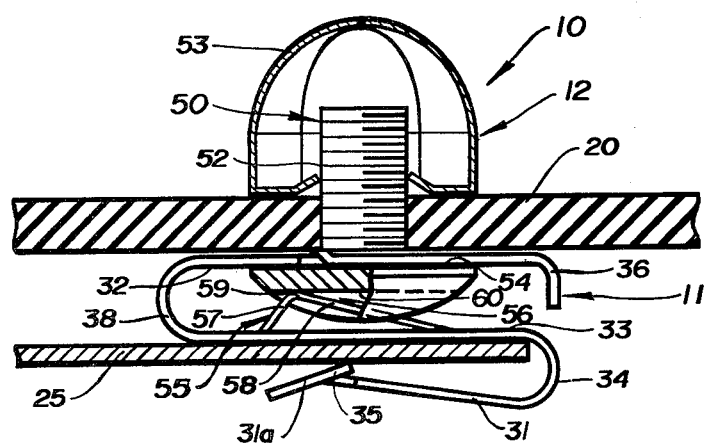
FIG. 2 is a side view of the clip securing an automobile splash guard to a thin sheet-metal supporting plate with the guard being shown in section and bolt head partly broken away for clarity of illustration.

Having reference to the drawings, attention is directed first to FIGS. 1 and 2, which illustrate an attachment clip embodying this invention, designated generally by the number 10, and which can be installed in operative relationship to a splash guard. A splash guard, designated generally by the numeral 20, is shown in FIG. 2 along with a portion of a metal sheet 25 which is an element of a vehicle wheel well to which the splash guard is desired to be secured by means of the clip 10. The structure of the splash guard 20 and sheet metal portion 25 of the wheel well are of a conventional nature and are not otherwise described or illustrated as their specific structures do not comprise a portion of this invention. The structures are shown to illustrate the application of the attachment clip comprising a Z-shaped, spring clip 11 and guard fastening means 12 in combination with a splash guard 20 that is formed as a sheet of rubber and wheel well element 25 of conventional construction.

The attachment clip 10 of this invention includes as the basic components thereof, a Z-shaped clip 11 integrally formed from an elongated strip of metal having a characteristic resilience and to which fastening means 12 is secured. This fastening means 12 is preferably a screw-threaded bolt and nut which serves to secure the splash guard to the clip 10. The Z-shaped clip 11 comprises a first or wheel well mounting leg 31 and a second or guard mounting leg 32 which are joined by interconnecting bar or intermediate leg 33. An end loop portion 34 is formed at the juncture of the first leg 31 and interconnecting bar 33. Formed near the terminal end 31a of the first leg 31 are a pair of barbs 35 that project inwardly toward the bar 33 and which frictionally engage with the sheet metal of the wheel element 25. The barbs 35 enhance the holding power of the clip while the terminal end 31 of the leg is turned slightly outward to facilitate entry of the wheel well element. The first leg 31 and interconnecting bar 33 are thus seen to form a resilient clamping element with respect to the wheel well element 25.

The second or guard leg 32 of the attachment clip 10 preferably includes a transversely extending lip 36 which projects downwardly from the leg 32 towards the interconnecting bar 33 at the terminal end of the guard leg 32 as shown in FIGS. 1 and 2. Also formed on this second leg are a pair of barbs 37 that project relatively outward. These barbs 37 are designated to frictionally engage with the splash guard 20 and are oriented to prevent possible disengagement of the fastening means from the splash guard 20. A separation loop 38 is located between the guard leg 32 and interconnecting bar 33 to provide adequate vertical displacement between these two portions of the clip for insertion of a fastening means.

Figure 3:
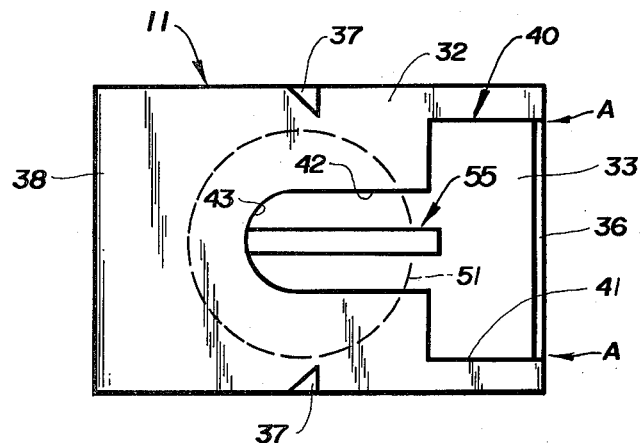
FIG. 3 is a top plan view of FIG. 1 with the broken-line circle indicating the position of the head of the fastening means.
Figure 4:
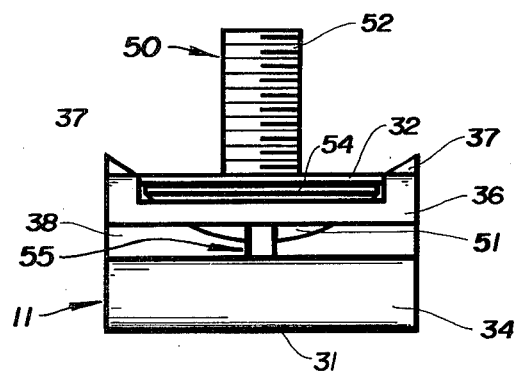
FIG. 4 is an end elevational view of the right end of FIG. 3 but including the headed screw threaded bolt of a fastening means.

A T-shaped slot 40 as best seen in FIGS. 1 and 3 as formed in the guard leg 32. The T-shaped slot 40 includes a head or cross-bar portion 41 and a channel 42 terminating in a curved end 43. The head portion 41 is a rectangular slot extending transversely across the leg and is located adjacent to the lip 36. This head portion 41 forms a cross-bar portion of the T-shaped slot 40 and is of a width A-A that is sufficient to permit passage of the bolt head therethrough. The channel 42 extends from the head portion 41 to approximately the midpoint of the second leg 32 and terminates in curved portion 43. Preferably, the slot 40 is formed such that the channel 42 is centrally disposed in the leg and the curved end 43 is located at the center of the leg 32. Referring to FIGS. 1 and 4, it will also be noted that the cross-bar portion 41 is partially formed in the lip 36 to facilitate entry of the bolt head for the particular attachment clip of the illustrated relative dimensions.

As can be seen in FIGS. 2 and 4, a fastening means 12 extends through the second or guard leg 32 as a means of securing splash guard 20 to the Z-shaped clip 11. This fastening means is shown as being a screw-threaded bolt 50 having a head 51 and a threaded shaft 52 and a cooperatively threaded nut 53. When the bolt 50 is secured to the guard leg 32, it is positioned such that its shaft 52 or threaded shank, is positioned in the curved end 43 of the T-shaped slot 40. When the bolt 50 is secured to a splash guard 20, the head 51 is drawn to bring a flat base surface 54 into clamped, contacting engagement with the inwardly facing surface of the guard leg 32.

A spring tongue 55 is integrally formed in the interconnecting bar 33. This spring tongue 55 is punched out of the interconnecting bar 33 and projects toward the guard leg 32 but has its two opposite ends secured to and remaining connected with the bar. The spring tongue itself extends toward the guard leg 32, as shown in FIG. 4, and is configured and relatively dimensioned so as to enter and interfit in a screw-driver slot 56 formed in the bolt head 51. This spring tongue is located in longitudinal alignment with the channel 42 as shown in FIG. 3. One function of the spring tongue 55 is to exert pressure on the head 51 of the bolt such that the head 51 is forced into adjacent contacting engagement with surface portions of the guard leg 32. This objective is accomplished by having the tongue 55 project a sufficient distance toward the guard leg 32 so as to engage with the bottom of the slot 56 and exert a resilient biasing force to hold the bolt head 51 in engagement with the guard leg. Another important function of the spring tongue 55 is to prevent relative rotation of the bolt 50 when assembled with the Z-shaped clip 11 while a nut 57 is threaded onto or off the threaded shaft 52.

Having reference specifically to FIG. 2 of the drawings, it will be noted that this tongue 55 is formed with a particular configuration that is of advantage in assembly of bolt 12 with the clip. It will be seen that this tongue 55 is formed with two distinct sections 57 and 58 which are relatively oriented to form a triangle having an apex 59. The one section 57 is relatively short and projects from the interconnecting bar 33 at a steep angle, whereas the other section 58 is disposed at a relatively shallow angle. This configuration places the apex 59 at a point where it will not contactingly engage the bottom surface 60 of the slot 56 until the bolt 12 has been almost fully assembled with the clip. This configuration facilitates assembly as it significantly reduces the force required to push the bolt 51 into the space between the guard leg 32 and the interconnecting bar 33.

Assembly of the bolt 12 with the Z-shaped clip 11 is accomplished as follows. The head 51 of the bolt 50 is inserted through the head portion 41 of T-shaped slot 40 as the width of the head portion A-A is greater than the diameter of the bolt head 51. During the first stages of the assembly, the bolt head 51 is tilted inwardly and is disposed with its slot 56 aligned to permit entry therein of the spring tongue 55. During the last stages of assembly, the shaft 52 is moved into channel 42 as more of the head 51 is inserted into the opening between the guard leg 32 and interconnecting bar 33. When finally assembled, the head 51 is oriented as shown in FIGS. 2 and 4 with respect to the spring tongue 55 and guard leg 32 and is held in contacting engagement with the guard leg.

Utilization of the attachment clip of this invention with a splash guard 20 and automobile having a wheel well that includes a sheet metal element 25 is shown in FIG. 2. The clip 11 with the bolt 50 assembled therewith is first secured in clamping relationship with the sheet metal element 25. The bolt 50 may now have its shaft 52 projected through an aperture or slit formed in a splash guard 20 such that a securing means such as the nut 57 may be threaded onto the exposed portion of the shaft at the outer side of the splash guard. The nut 57 may be of the acorn-type as disclosed in the drawing figures for aesthetic and safety purposes. It will be understood that other types of fastening means 12 may be utilized to perform equivalent functions of the illustrated bolt and nut type.

It will be readily apparent from the foregoing detailed description of illustrative embodiments of this invention that a particularly novel and extremely effective attachment clip structure is provided. The attachment clip structure is relatively simple to fabricate and requires a minimal amount of time for installation with regard to a splash guard and automotive vehicle. The structure utilizing a Z-shaped clip portion and fastening means for the securing of the splash guard to the clip is economical to fabricate and results in an effective attachment clip. The specific construction of the attachment clip results in the retention of a splash guard to a automotive vehicle without the necessity of drilling holes into the wheel well to secure the splash guard. Additionally, this attachment clip permits the securing of a splash guard to an automotive vehicle in such a fashion that rust or corrosion is not likely to be induced.

Having thus described this invention, what is claimed is:

1. An attachment clip for securing of an article to a sheet-form support element comprising a fastener element having an elongated shank adapted to be projected through an article to be thereby secured to a support element, a relatively enlarged head carried by said shank and securing means selectively positionable on said shank in mechanically secured engagement to maintain an article on said shank, and a clip adapted for cooperative mechanical interengagement with said fastener element and a sheet-form support structure for mounting of said fastener element on the support structure in a predetermined relative position, said clip having first, second and intermediate legs extending in superposed relationship with respect to each other, each of said first and second legs mechanically secured to said intermediate leg and disposed at relatively opposite sides thereof, said first leg being resiliently biased toward said intermediate leg to effect a clamping engagement with a sheet-form support structure inserted therebetween, said second leg adapted to engage with the head and shank of said fastener element to retain said fastener element in mechanically secured relationship with said clip with said fastener element head disposed between said second and intermediate legs, said second leg having an aperture formed therein through which the elongated shank of said fastener element projects, said clip including a resilient tongue operatively engageable with said fastener element to exert a biasing force against said fastener element to maintain the head thereof against said second leg and in relatively fixed relationship to said second leg.

2. An attachment clip for securing of an article to a sheet-form support element comprising a fastener element having an elongated shank adapted to be projected through an article to be thereby secured to a support element, a relatively enlarged head carried by said shank and securing means selectively positionable on said shank in mechanically secured engagement to maintain an article on said shank, and a clip adapted for cooperative mechanical interengagement with said fastener element and a sheet-form support structure for mounting of said fastener element on the support structure in a predetermined relative position, said clip having first, second and intermediate legs extending in superposed relationship with respect to each other, each of said first and second legs mechanically secured to said intermediate leg and disposed at relatively opposite sides thereof, said first leg being resiliently biased toward said intermediate leg to effect a clamping engagement with a sheet-form support structure inserted therebetween, said second leg adapted to engage with the head and shank of said fastener element to retain said fastener element in mechanically secured relationship with said clip with said fastener element head disposed between said second and intermediate legs, said second leg having an aperture formed therein through which the elongated shank of said fastener element projects, said clip including a resilient tongue formed with said intermediate leg and which projects into contacting engagement with said fastener element head to exert a biasing force against said fastener element to maintain said fastener element in relatively fixed relationship to said second leg.

3. An attachment clip according to claim 1 or 2 wherein said second leg comprises a flat plate having a T-shaped slot formed therein, said T-shaped slot having the cross-bar thereof configured to permit passage of the head of said fastener element therethrough and the leg of said slot forming the aperture through which the fastener element shank projects.

4. An attachment clip according to claim 3 wherein said second leg is formed with a lip at one end thereof and which lip extends toward said intermediate leg.

5. An attachment clip according to claim 4 wherein the cross-bar portion of said T-shaped slot extends partially into said lip to facilitate passage therethrough of said fastener element head therethrough.

6. An attachment clip according to claim 1 wherein said fastener element head is formed with a slot in an end face thereof and said tongue is adapted to project into said slot to prevent rotation of said fastener element.

7. An attachment clip according to claim 1 wherein said tongue is formed with said intermediate leg and projects into contacting engagement with said fastener element head.

8. An attachment clip according to claim 2 wherein said fastener element head is formed with a slot for receiving said tongue.

9. An attachment clip according to claim 7 or 8 wherein said tongue is formed as an elongated strip said intermediate leg and is secured at each of its opposite ends to the main body of said intermediate leg.

10. An attachment clip according to claim 9 wherein said tongue is formed with a particular configuration having a relatively short portion thereof adapted to be disposed in contacting engagement with a bottom surface of said slot, said relatively short portion being positioned to engage said fastener element head only when said fastener element is substantially fully assembled with said clip.

11. An attachment clip according to claim 9 wherein said tongue is formed with a first section disposed at a relatively large angle with respect to said intermediate leg and a second section disposed at a relatively shallow angle with respect to said intermediate leg, said tongue being oriented with said second section being disposed next adjacent the free end of said second leg.

12. An attachment clip according to claim 3 wherein said tongue is an elongated strip and said fastener element head has a slot formed in an end face thereof to receive said tongue, said tongue disposed to extend in parallel relationship to the leg of said T-shaped slot.

13. An attachment clip according to claim 3 wherein said second leg is formed with at least one barb-like projection extending in a direction relatively outward of said clip for engagement with an article to be secured thereby, said barb-like projection oriented to resist sliding movement of an article that would otherwise result in removal of said fastener element from said T-shaped slot.

14. An attachment clip according to claim 13 wherein said second leg is formed with at least two of said barb-like projections.

15. An attachment clip according to claim 13 wherein said barb-like projections are formed on respective longitudinal marginal side edge portions of said second leg.

16. An attachment clip according to claim 1 or 2 wherein said first and intermediate legs are integrally formed from a flat plate having a characteristic resilience and opposed surfaces biased into gripping engagement with a sheet-form element inserted therebetween, and at least one of said first and intermediate legs is formed with at least one barb-like projection extending in the direction of the other of said first or intermediate legs, said barb-like projection oriented to resisting sliding withdrawal of a sheet-form support element from between said first and intermediate legs.

17. An attachment clip according to claim 16 wherein said first leg or said intermediate leg is formed with at least two of said barb-like projections.

18. An attachment clip according to claim 16 wherein said barb-like projections are formed on respective longitudinal marginal side edge portions of said first leg.

19. An attachment clip according to claim 1 or 2 wherein said clip is formed from an elongated strip of sheet material having a characteristic resilience and formed into a Z-shaped configuration.

20. An attachment clip for securing of an article to a sheet-form element comprising
a fastener element having an elongated shank adapted to be projected through an article to be thereby secured to a support element, a relatively enlarged head carried by said shank and securing means selectively positionable on said shank in mechanically secured engagement to maintain an article on said shank, and
a clip adapted for cooperative mechanical interengagement with said fastener element and a sheet-form support structure for mounting of said fastener element on the support structure in a predetermined relative position, said clip having first, second and intermediate legs extending in superposed relationship with respect to each other, each of said first and second legs mechanically secured to said intermediate leg and disposed at relatively opposite sides thereof, said first leg being resiliently biased toward said intermediate leg to effect a clamping engagement with a sheet-form support structure inserted therebetween, said second leg adapted to engage with the head and shank of said fastener element to retain said fastener element in mechanically secured relationship with said clip with said fastener element head disposed between said second and intermediate legs, said second leg comprising a flat plate having a lip formed along an edge thereof and extending toward said intermediate leg and a T-shaped slot formed therein with the crossbar of said slot disposed next adjacent to and extending substantially parallel to said lip and the leg of said slot extending substantially perpendicular to said lip, the leg of said slot being of a width to permit passage of the fastener element shank therethrough, but prevent passage of the head thereof, the crossbar of said slot being of a size to permit passage of the fastener element head therethrough.

21. An attachment clip according to claim 20 wherein the crossbar of said slot extends partially into said lip to facilitate passage therethrough of said fastener element head.

22. An attachment clip according to claim 21 wherein said fastener element head is of a predetermined thickness and said lip is at least partially disposed in a plane of movement of said head disposed in parallel relationship to the plane of said second leg.

* * * * *